Fig. 2.

Oct. 20, 1964  D. W. MUEHLHAUSER  3,153,250
POSITIONING AND HOLDING APPARATUS
Filed April 1, 1963  8 Sheets-Sheet 3

Fig. 3A.

INVENTOR.
Donn W. Muehlhauser,
BY
John K. Simonds,
his ATTORNEY.

Oct. 20, 1964 D. W. MUEHLHAUSER 3,153,250
POSITIONING AND HOLDING APPARATUS
Filed April 1, 1963 8 Sheets-Sheet 4

Fig. 3B.

INVENTOR.
Donn W. Muehlhauser,
BY John H. Lemond,
his ATTORNEY.

Oct. 20, 1964 D. W. MUEHLHAUSER 3,153,250
POSITIONING AND HOLDING APPARATUS
Filed April 1, 1963 8 Sheets-Sheet 8

INVENTOR.
Donn W. Muehlhauser,
BY
ATTORNEY.

United States Patent Office 3,153,250
Patented Oct. 20, 1964

3,153,250
POSITIONING AND HOLDING APPARATUS
Donn W. Muehlhauser, Euclid, Ohio, assignor to The Pipe Machinery Company, Wickliffe, Ohio, a corporation of Ohio
Filed Apr. 1, 1963, Ser. No. 269,614
10 Claims. (Cl. 10—89)

This invention relates to a positioning and holding apparatus for positioning and holding elongated members in position for performing machining operations on an end portion thereof.

For the purposes if illustration, the invention is described as applied to the positioning and holding of pipes for threading an end portion thereof, its use for other purposes and for threading the ends of other elongated members being readily apparent from the illustrative example.

In the production of pipe, particularly the so-called seamless tubing, the starting billets vary somewhat in size. As a result, the untrimmed pipes drawn from the different billets are of different lengths. Further, after drawing the pipes are pulled through a straightener which conventionally is a three-roll straightener, of which two spaced rolls engage the pipe at one side and a third roll engages the pipe at a location therebetween at the other side. As a result of this procedure, as the trailing end of the untrimmed pipe leaves the entry roll of the straightener, its overhanging end is subjected to radial pressure transmitted by the middle roll while the pipe is held against transverse movement by the exit roll. Consequently the trailing end of the pipe quite frequently is bent or curved transversely of the pipe axis. The pipe is then cut to length, the leading end being first cut off and the trailing end next being cut off a standard measured distance from the cut leading end. Since the untrimmed pipes are of different lengths, the entire bent trailing end portion may be cut off, whereby the pipe is straight for its full length. On the other hand, frequently only part of the bent portion at the trailing end is cut off whereby all or part of the trailing end portion which is to be threaded is bent so that its axis is angularly disposed to the axis of the straight portion of the pipe.

During threading, a pipe is usually gripped in suitable chucks and held so that its axis is coincident with the axis of a rotary cutting head of a machine which is to chamfer and thread the end portion of the pipe. If the pipe is straight throughout its length, no special problem is presented. However, in most cases, the end portion of the pipe at what was the trailing end, is not coaxial with the remainder of the pipe. Consequently, if the remainder of the pipe is centered in the chucks so that its axis is coincident with that of the rotary head, the axis of the end portion to be threaded is not coincident with the axis of the head, but is eccentric to, and angularly disposed relative to, the rotational axis of the head. In such a case, the pipe wall is thinned down by the thread chasers too much at the inside of the bend and, at the opposite side of the bend, so-called "black threads" result from insufficient cutting by the chasers into the metal.

On the other hand, if the pipe is manipulated so that the end of the pipe is coaxial with the head, then, at the inner end of the threaded portion, there is too deep a cut into the metal at the outside of the bend and insufficient cutting and resultant black threads then appear at the inside of the bend.

The apparatus of the present invention comprises a combination of holding chucks with a centering chuck by which this defect in pipe manufacturing and prior positioning and holding devices is offset and compensated for to a very substantial degree. It accomplishes this end by positioning the pipe with respect to the rotary machine head so that the deviation of the end portion from a true straight position due to the bend, is prorated along the length of the end portion in such a manner that overcutting on one side and formation of black threads on the other side are reduced to a minimum for the particular degree of bend.

More specifically the invention is a combination of known floating chucks with a new positioner so related that the pipe is engaged on the end portion to be threaded and thereby positioned, then gripped by the floating chucks which are thereupon locked in their floated position, whereupon the positioner is retracted and the end portion threaded while the pipe is held by the locked chucks.

Various other objects and advantages will become apparent from the following description wherein reference is made to the drawings, in which.

Figure 1A:
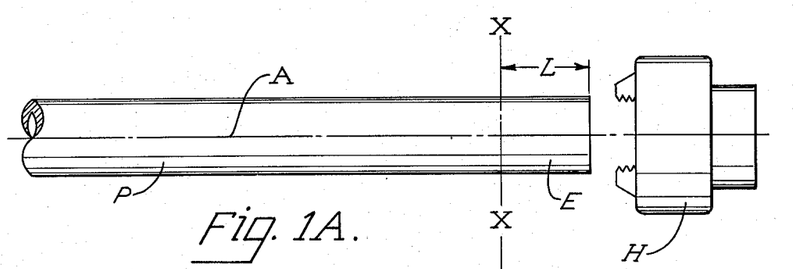
FIGS. 1A through 1D are diagrammatic illustrations of a length of pipe, illustrating the problems encountered in threading the end portion because of a bend in the portion to be threaded.

Referring first to FIG. 1A, the workpiece is shown as a length of pipe P of which the trailing end portion E to be threaded extends from the pipe end to a plane x—x, a distance indicated at L. The pipe is shown supported, as is customary, with its axis A, coincident with the axis of the rotary machine head H which is to perform the threading operation. If the pipe is straight, as indicated, the end portion to be threaded has its axis coincident with the axis of the machine head and hence, no problem is presented.

Figure 1B:
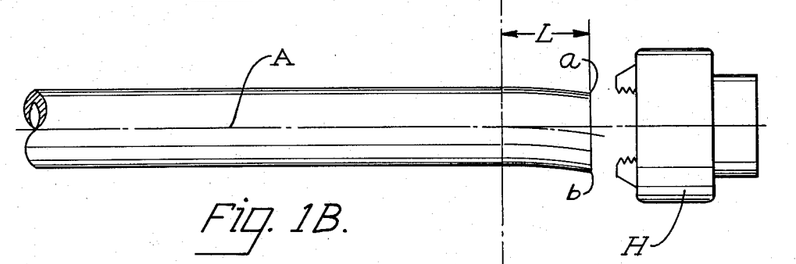

If, as illustrated in FIG. 1B, the end portion of the pipe is bent or curved, then the axis of the end portion from the end of the pipe for the distance L which is to be threaded, is bent and diverges from the axis of the machine head in a direction toward the head, and is eccentric thereto a considerable amount at the position of the machine head when the head is starting the cutting operation. Assuming the remainder of pipe is held coaxial with the head, then because of the curvature of the bent end, black threads will result due to insufficient cutting of the chasers into the pipe wall, and the stock will be cut too thin at b.

Figure 1C:
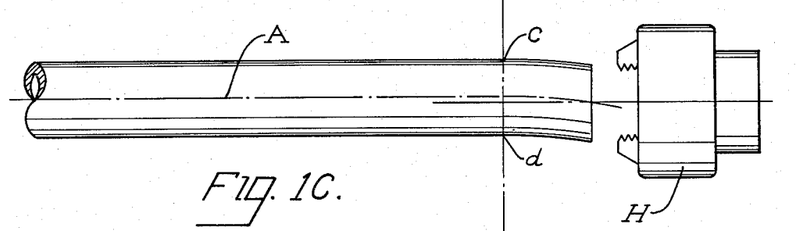

If, as illustrated in FIG. 1C, the pipe is held so that the axis at the outer end is coincident with the axis of the machine head, then proper threads would be produced adjacent the pipe end, but as the head approached the inner end of the threaded portion, the pipe wall would be cut too thin at c and black threads would occur at d.

Figure 1D:
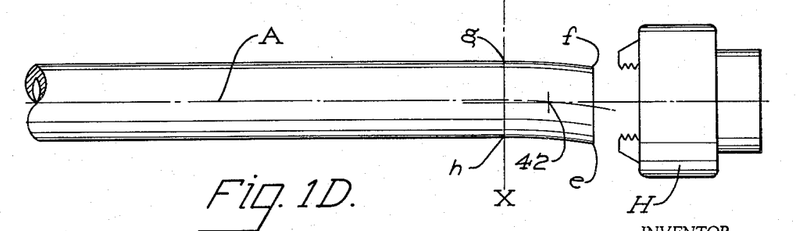

In accordance with the present invention, as illustrated in FIG. 1D, the pipe is positioned or moved so that its axis, half-way between the ends of the threaded portion, or at 42, intersects the axis of the head, and thereby the radial deviation of the axis from a true straight position due to the curvature at the end portion of the pipe is prorated so that full threads can be obtained at e, f, g, and h with a total deviation which, in the procedures of FIGS. 1B and 1C, would produce black threads. For example, the maximum which could normally be tolerated by the prior procedures would be 0.012 inch offset of the axis at the end of the pipe as compared with the axis at the plane XX, the inner end of the threaded portion. By centering the axial mid-portion of the threaded portion at 42 on the head axis, instead of centering either the outer end or the inner end of the threaded portion, almost twice as much deviation, for example 0.030 inch, from a straight condition can be tolerated without producing undesirable black threads or thinness.

The present apparatus operates to bring the axis of the threaded portion at a point mid-way between its ends coincident with the axis of a predetermined axis which is the axis of the cutting head.

Figure 2:
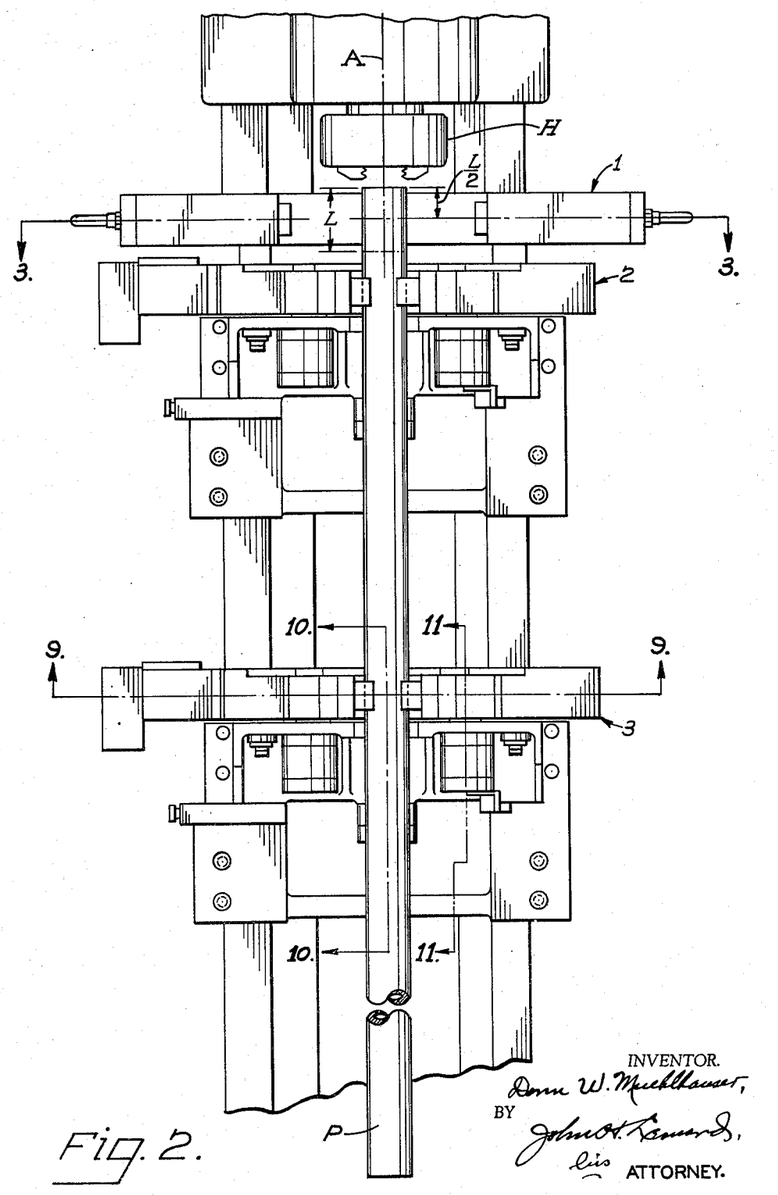
FIG. 2 is a top plan view of the apparatus of the present invention, associated with a rotary threading head, showing the relation of the pipe and its axis to the rotational axis of the head, in accordance with the present invention.

For this purpose, the apparatus illustrated generally in FIG. 2 is employed. As therein illustrated, the length of pipe P is to be threaded by tools carried in the rotary head H of a threading machine of a type wherein the head H is advanced axially of the pipe during the cutting operation and retracted after the cutting operation while the head is rotated about the predetermined horizontal axis A.

The apparatus comprises principally a positioner 1 and two holding chucks 2 and 3. The positioner is positioned axially of the pipe so as to engage the pipe midway between the ends of the threaded portion, that is, at $$\frac{L}{2}$$

The positioner is one which, when operated, engages the outer periphery of the pipe and moves the engaged portion transversely of its axis until the axis at the engaged portion is coincident with, or intersects, the predetermined axis which is the rotational axis of the cutting head.

The chucks 2 and 3 are floating chucks in which the jaws are carried on radially floating carriages so that the jaws can float into adjusted relation to the pipe and engage the pipe in whatever position it happens to be moved to at the location of the chucks 2 and 3 due to the movement imposed on the pipe by the positioner 1.

In general, the length of the portion to be threaded is short in relation to the total length of the pipe and the V-rests are uniformly distributed along the length of the pipe.

As one example, in the form illustrated, assuming the length of the portion to be threaded is about 3¼ inches, the positioner is placed so that it grips the pipe 1⅝ inches from the outer end. Chucks 2 and 3 are arranged in spaced relation endwise of the axis of the pipe, the chuck 2 being relatively close to the positioner 1, for example, its axial mid-portion being about 5½ inches from the end to be threaded. The chuck 3 may be spaced about 18 inches from the chuck 2, and the V-rests spaced about three to four feet apart along the remainder of the length of the pipe.

There is, of course, considerable flexibility in the pipe, and when the portion to be threaded is positioned by the positioner 1, the major portion of the pipe tends to remain on the V-rests, and the pipe flexure permits accommodation of the pipe to the rests and floating chucks. Since the chucks 2 and 3 are counterbalanced relative to the weight of the pipe to be handled, they accommodate themselves to the new or flexed position of the pipe at the portions which they are to grip, respectively, grip the pipe firmly, and then are locked in their floatingly adjusted positions so that the pipe will be firmly held in this position after the positioner has been retracted, and throughout the threading operation and until after the retraction of the head H from the pipe. The pipe is then removed and a new pipe inserted and the operation repeated.

Generally the counterbalances of the chucks 2 and 3 are set so that they would tend to hold the pipe with its axis coincident with the predetermined axis A of the spindle, were it not for the movement of the pipe by the positioner 1.

While it is preferable that the positioner 1 engage the portion to be threaded mid-way between its ends, it can, of course, be located at other positions lengthwise of the threaded portion, depending upon the deviation of the axis from a straight line and the proration to be made, but generally the best results are obtained, when it is mid-way between the ends of the threaded portion, as described.

A positioner suitable for this purpose is illustrated in FIGS. 3 through 8. It comprises a rigid frame, indicated generally at 8 which, if desired, may be adjustable endwise of the axis A, but which preferably it is stationary. The frame has a central notch 9 arranged to receive the pipe radially and position it so that it can be engaged by centering or positioning jaws 10. These jaws 10 are arranged so that they engage the pipe and move it so that the axis of the end portion engaged is coincident with, or intersects, the axis A of the head H.

Since the jaws 10 engage the pipe end portion to be threaded, they are arranged so that they can be retracted rapidly out of the path of the rotary head and thus permit the head to move axially, during threading, onto the pipe from the outer end of said end portion and along the exterior of the portion of the pipe which had been gripped by the jaws 10 before their retraction. The diameter of the head generally is quite large in relation to the diameter of the pipe, and thus considerable movement of the jaws outwardly from operative to retracted position is necessary to accommodate the head between the retraacted jaws 10 without interference of the jaws with the head.

For this purpose, suitable jaw assemblies are provided for the jaws, including carriages for moving the jaws into operative position for positioning the pipe and extensible and retractible supports on the carriages for rapid advance of the jaws prior to their engagement with the pipe and rapid retraction after release from the pipe. For purposes of illustration, two jaws are provided and since both are the same in form and function, only one will be described in detail.

Figure 3A:
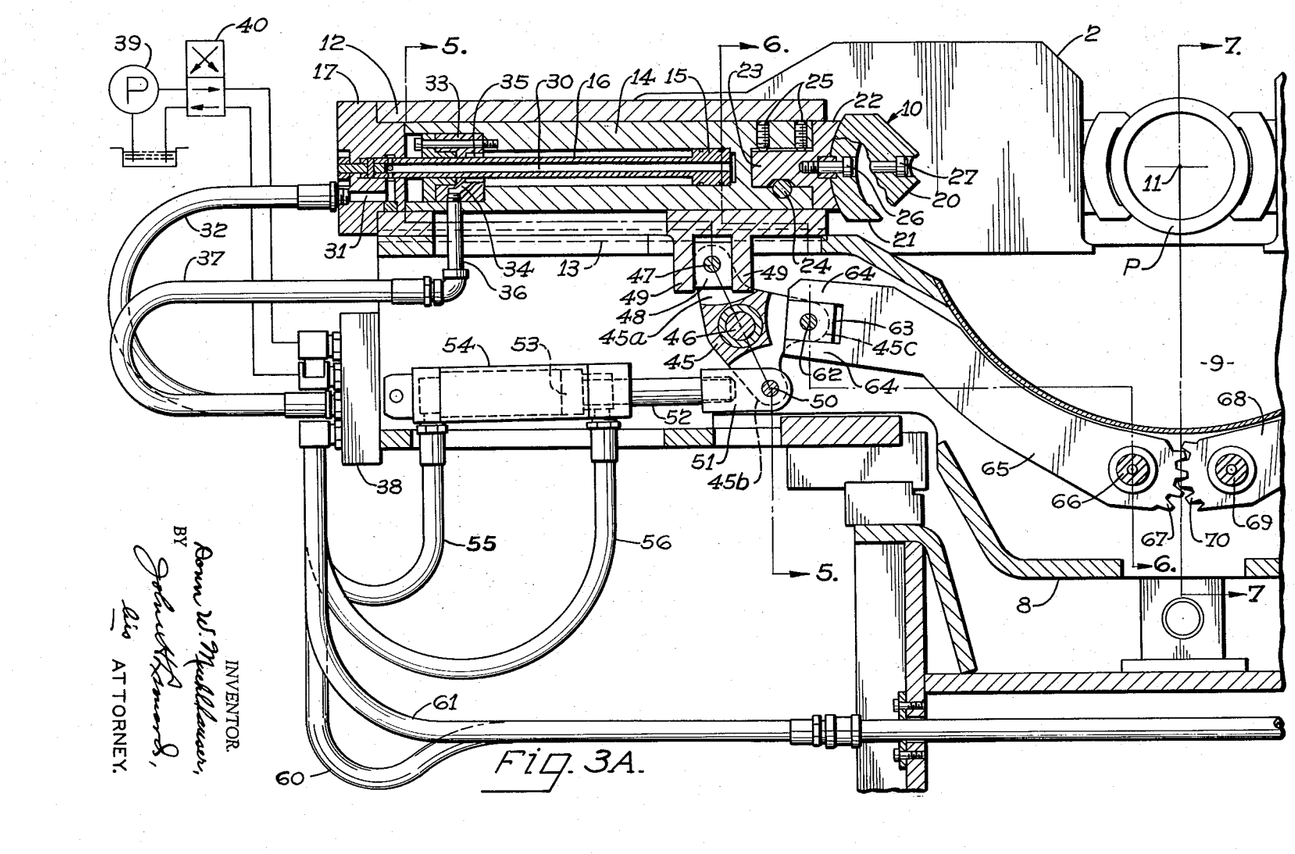
FIGS. 3A and 3B are, together, an enlarged vertical sectional view taken on the line 3—3 in FIG. 2.

Referring to the left hand jaw assembly in FIG. 3A, a jaw carriage 12 is slidably mounted in a suitable slide 13 on the frame 8 for sliding in a lineal path toward and away from the axis of the head. Telescopically mounted in the carriage 12 is a retractible and extensible jaw support 14 which is suitable axially endwise of the carriage 12 parallel to the path of the carriage. In the form illustrated, the support 14 is a cylinder of a piston and cylinder assemblage and a piston 15, having a piston rod 16 is mounted therein. The outer end of the rod 16 is connected fixedly to a suitable block 17, fixedly mounted on the end of the carriage 12. This support or cylinder 14 preferably is arranged so that its axis is horizontal and intersects the axis of the head H at right angles.

Generally pipes of different sizes are to be positioned from time to time, and consequently the jaws 10 each may be composed of detachable portions, such as a portion 20 for engaging small diameter pipes, a portion 21 for engaging intermediate diameter pipes, and a portion 22 for engaging larger diameter pipes. Portion 22 is secured to an end wall of the support 14 in operative position so that the axis of curvature of its face is coincident with the axis of the head. For this purpose, the portion 22 may be provided with a neck 23 received in a suitable bore in the end wall of the support 14 and secured in properly rotated position about the axis of the neck by means of transverse pin 24 and lock screws 25 which engage a suitable slot in the neck portion 23. The portion 21 may be secured to the portion 22 by means of a bolt 26. If the portion 20 is to be used, it and the portion may be secured in place by means of a bolt 27.

As mentioned, it is necessary that the jaws be moved a considerable distance to permit the head H to pass therebetween when they are in the retracted position and this movement should be extremely rapid. For this purpose, the piston rod 16 is provided with a duct 30 which opens through the piston at the head end of the cylinder and which at its opposite end is connected to the duct 31 and the block 17. Pressure fluid is supplied by a flexible conduit or hose 32 in the duct 31. The cylinder or support 14 is closed at the rod end by suitable block 33 having a duct 34 therein which connects with an annular passage 35 so as to admit pressure fluid into the rod end of the piston. The duct 34 is connected by a pipe 36 to a flexible hose 37. The hoses are connected in a suitable manner to a distribution manifold 38 to which pressure fluid is supplied by a motor driven pump 39 through a reversing valve 40 which, if desired, may be remotely controlled. The hoses 32 and 37 are so connected that as one is vented the other is connected to the source of pressure fluid, and these relations can be reversed by setting a reversing valve 40. Thus, upon admitting pressure fluid through the hose 32, the support 14 of the carriage 12 is advanced toward the head axis. Upon reversal of the flow, it is retracted.

The jaws 10 are so selected that the supports 14 are moved to fully extended position for all sizes of pipes, and both jaws 10 are moved precisely the same distance with respect to their carriages 12. This extension is merely for the purpose of rapid positioning of the jaws close to their operating positions and retraction from the positions close to their operative positions.

In order to move the jaws to fully operative positions, the carriages 12 are moved concurrently equidistantly along their paths toward the head axis. For moving the left hand carriage 12, a suitable rocker 45 is mounted by a pivot 46 on the frame 8. The rocker 45 has three arms 45a, 45b, and 45c, spaced about the pivotal axis. The arm 45a is connected to the carriage 12 by means of a pivot 47 and slide 48 which operates between yoke arms 49 rigid with the carriage 12. The arm 45b, at the opposite side of the axis of the pivot 46 from the arm 45a, is connected by a pivot 50 to a yoke 51 which is mounted on a piston rod 52 of a piston 53. The piston 53 is reciprocable in cylinder 54. The head end of the cylinder 54 is connected by a hose 55 to the manifold 38. The rod end is connected to the manifold 38 by a hose 56. These hoses are so connected that when pressure fluid is admitted to the head end of the cylinder 14, it advances the piston axis of the head, and when pressure fluid is admitted to the rod end of the cylinder 54, it retracts the piston 53. Retraction of the piston rocks the rocker 45 so that the slide 48 thrusts the carriage 12 toward the axis. Advance of the piston moves the carriage 12 toward retracted position. Consequently, by setting the valve 40, the right hand jaw 10 can be advanced toward the head axis by movement of its support 14 theretoward and concurrent movement of its carriage 12 theretoward.

Figure 3B:
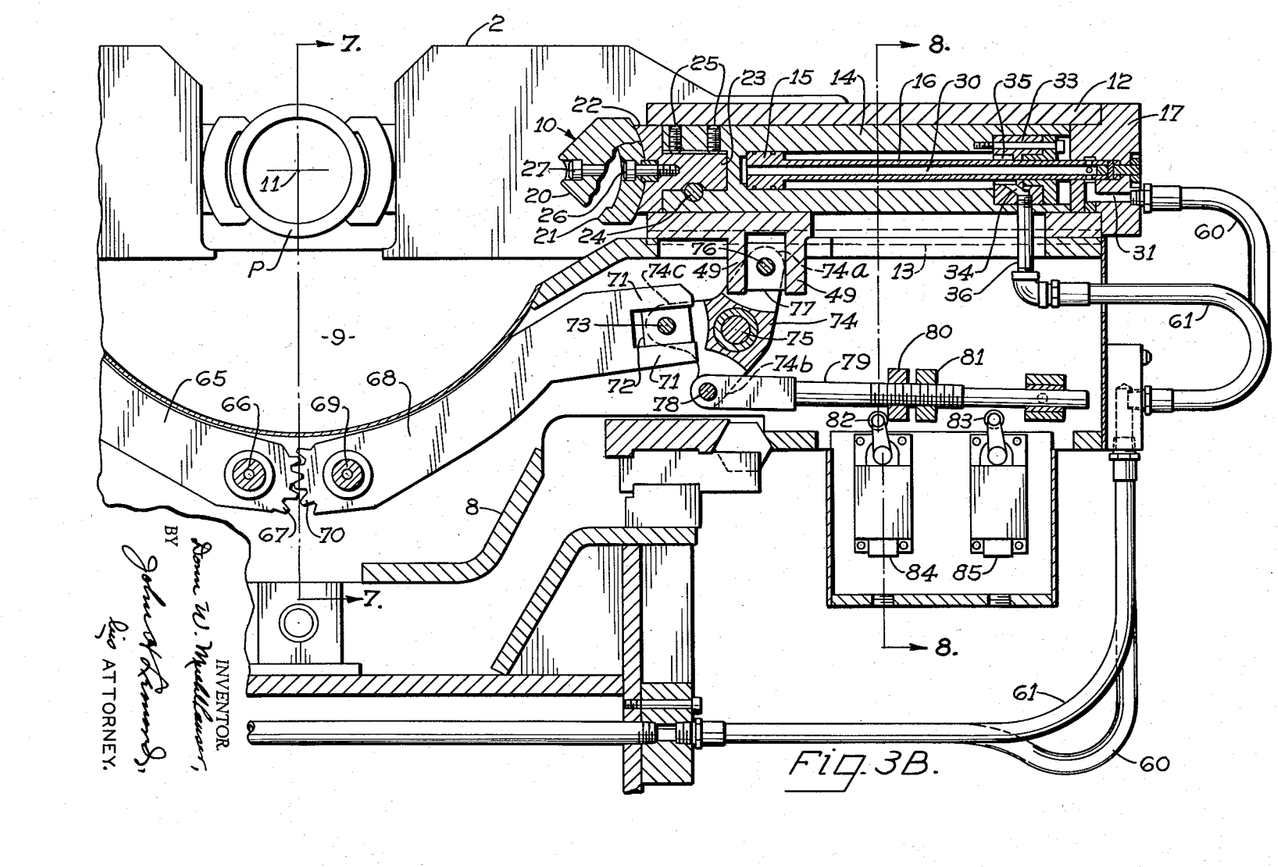
Figures 4, 5:
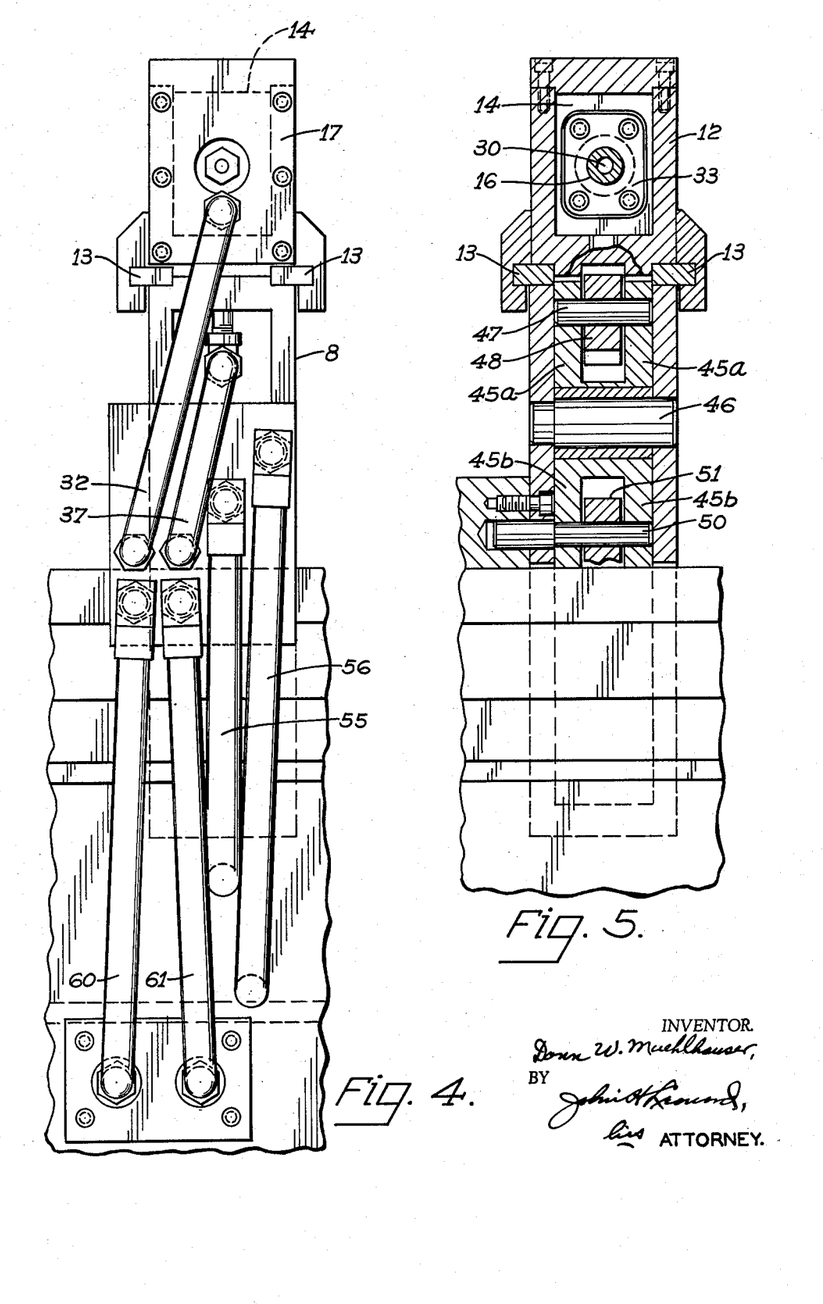
FIG. 4 is a left end elevation of the structure illustrated in FIG. 3.
FIGS. 5 through 8 are vertical cross sectional views taken on lines 5—5 through 8—8, inclusive, respectively, in FIG. 3.
Figure 6:
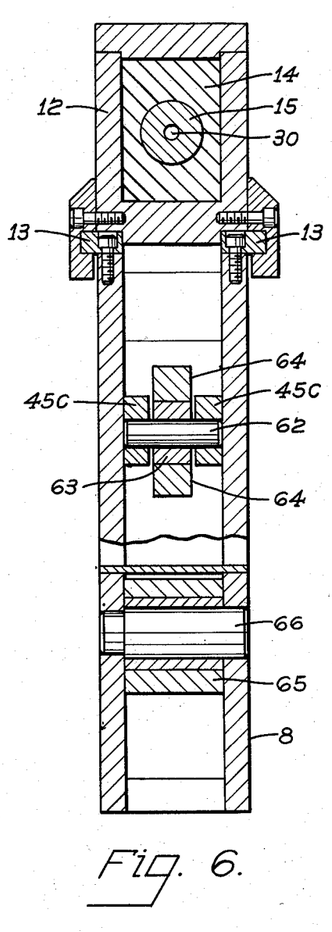
Figure 7:
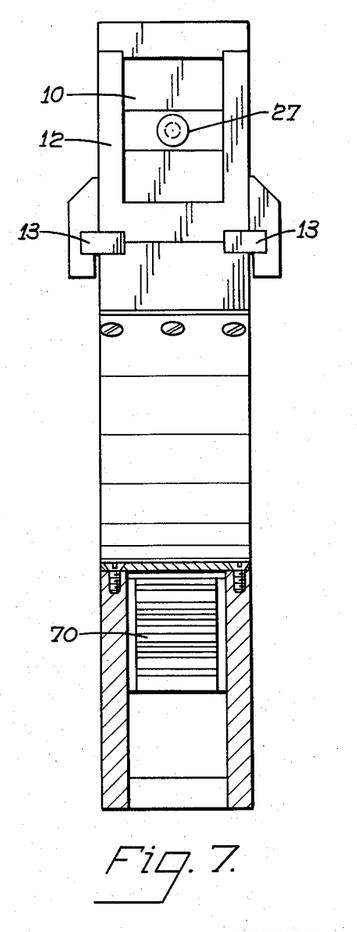

For moving the right hand carriage 12 and the jaw support 14, the duct 30 in the piston rod 16 of the right hand support 14 is connected to a conduit 60, and the outer end of the support 14 has its duct 34 connected to a conduit 61. These conduits are connected to the manifold 38 so that they operate in the same manner and in the same sequence as the conduits 32 and 37, for concurrent rapid advance and retraction of both jaws.

In order to move the carriage 12 of the right hand jaw, a suitable linkage mechanism is provided. For this purpose, the arm 45c of the rocker 45 is connected by a pivot 62 to a slide 63 which cooperates with yoke arms 64 of a crank arm 65. The arm 65 is mounted on a pivot 66 in the frame for rocking about a horizontal axis parallel to the axis of the pivot 46. At the end adjacent its pivot 66, the arm 65 is provided with a gear segment 67 which is coaxial with the pivot 66. An arm 68, corresponding to the arm 65, is mounted on a pivot 69 in the frame and carries at the end adjacent its pivot 69, a gear segment 70. The gear segments are in mesh with each other so that rocking of the arm 65 imparts like and equal rocking to the arm 68. At the end opposite from the pivot 69, the arm 68 is provided with yoke arms 71 which accommodate a slide 72. The slide is connected by a pivot 73 to a rocker 74, which corresponds to rocker 45, except that it is oppositely arranged, and which has arms 74a, 74b, and 74c. The rocker 74 is mounted on a pivot 75. The arms 74a is connected by pivot 76 to a slide 77, the slide 77 operating between the yoke arms 49 of the right hand carriage 12. Thus both carriages 12 are moved concurrently in fixed predetermined relation to each other toward and away from the centering axis 11. Connected to the arm 74b of the rocker 74 by means of a pivot 78 is a slide rod 79. The rod 79 carries cam discs 80 and 81. These discs cooperate with the levers 82 and 83, respectively, of switches 84 and 85, the relation being such that when the jaws 10 are in operative position, the switch 85 is operative to energize a signal, and when the jaws are retracted, switch 84 is operative to energize a signal. Thus the condition of the positioner is at all times readily ascertainable.

Figures 8, 9:
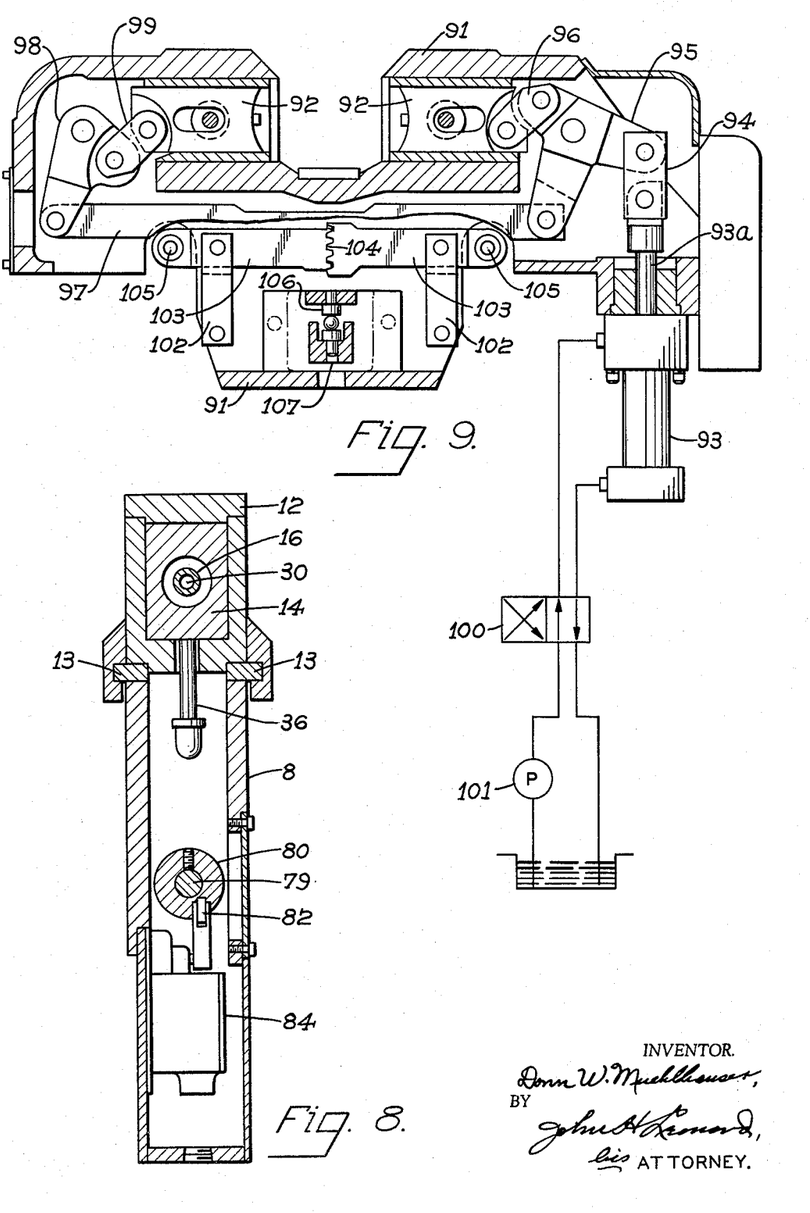
FIG. 9 is an enlarged vertical cross-sectional view of one of the floating chucks of the apparatus, and is taken on the line 9—9 in FIG. 2.

The floating chucks 2 and 3 may be indentical and preferably are of the type disclosed in the W. L. Benninghoff United States Patent No. 2,932,041, issued April 12, 1960. Accordingly, only one of the chucks will be described briefly in detail, the complete characteristics thereof and detailed construction being readily apparent from the above patent. As therein more fully described, the chuck 2 comprises a stationary frame 90 in which is mounted a free floating frame 91. Mounted in frame 91 for movement toward and away from each other are the gripping jaws 92. The jaws 92 are driven by a reversible piston and cylinder assemblage 93, the piston rod 93a of which is connected by a link 94 to a rocker 95 which is pivotally mounted on the floating frame 91. The rocker 95 is connected by a link 96 to one of the jaws 92. It is connected by a link 97, a rocker 98, and a link 99 to the other of the jaws. This arrangement constrains the jaws to move concurrently equidistantly. Pressure fluid is supplied to the assemblage 93 through a suitable reversing valve 100 from a suitable pump 101.

The floating frame 91 is suspended by suitable links 102 from rocker arms 103 which have intermeshing gear segments 104 coordinating their movement so as to maintain the floating frame horizontal while permitting it to float freely in all directions in a vertical plane. The arms 103 are connected by pivots 105 to the stationary frame 90.

The frame 91 is provided with a supporting pin 106. A rocker 107 having arms 107a and 107b is pivotally mounted on the frame 90. The arm 107a engages the pin 106. The arm 107b is connected to a rod 108. A counterbalance spring 109 is carried on the rod and at one end engages the frame 90 and at the other end engages an abutment 110 on the rod 108. The abutment 110 is adjustable endwise of the rod by nuts 111. Thus, by adjustment of the compression of the spring 109, compensation for the weight of the pipe to be operated on is obtained so that the jaws 92 and floating frame 91 move the pipe into position wherein its axis is coincident with the axis of the head.

Figure 10:
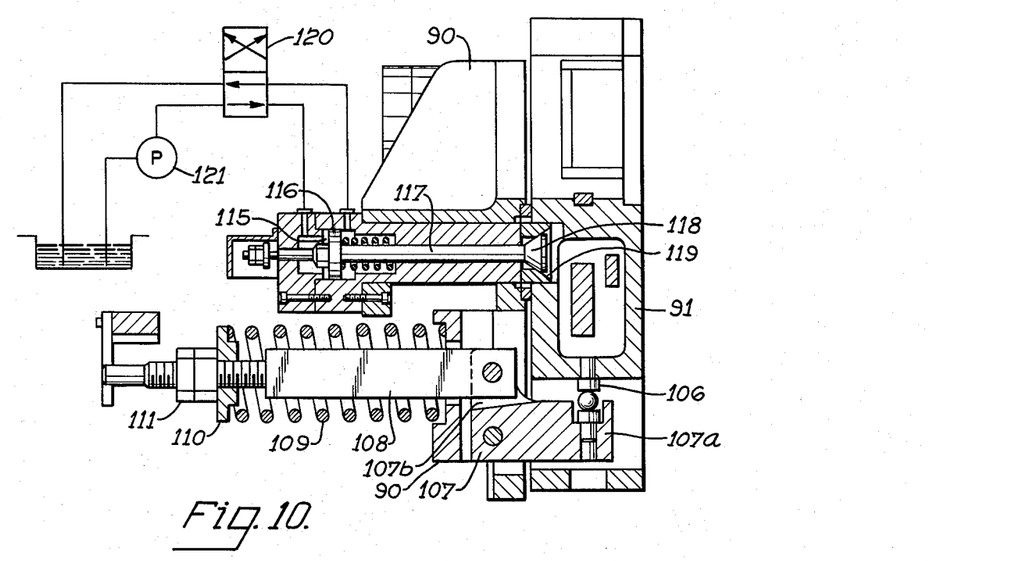
FIG. 10 is an enlarged vertical longitudinal sectional view of the floating chuck, taken on the line 10—10 of FIG. 2.

In order to center the floating frame for receiving a pipe initially, the stationary frame 90 is provided with a cylinder 115 in which is a piston 116 having a rod 117. The piston rod 117 has a tapered frusto-conical end 118 which engages and extends through a correspondingly tapered passage 119 in the floating frame 91. The arrangement is such that when the frusto-conical portion is moved to the right in FIG. 10, it releases the frame 91 for floating movement. When it is moved to the left, it engages the wall of the passage 119 and draws the frame to a centered position. Pressure fluid for operating the piston 115 may be supplied through a suitable reversing valve 120 from a suitable pump 121.

Figure 11:
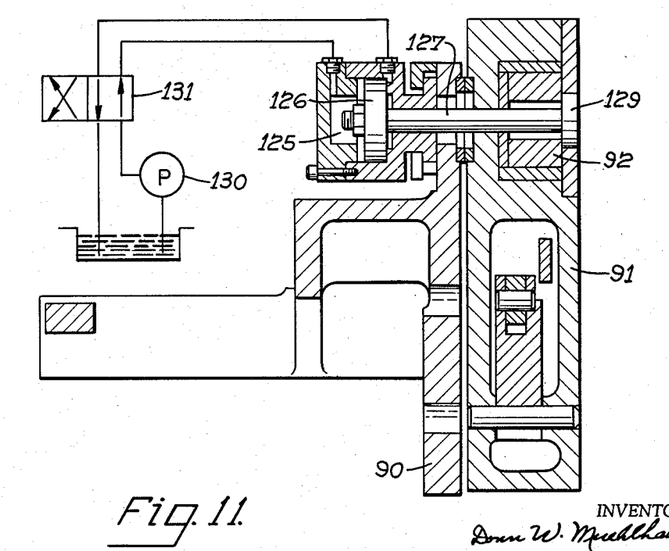
FIG. 11 is an enlarged vertical longitudinal sectional view taken on the line 11—11 of FIG. 2.

In order to lock the jaws 92 in clamping position and the floating frame 91 in the adjusted position to which it has floated when released and supporting a pipe, the frame 90 has suitable cylinders 125 mounted thereon for limited floating movement in a direction parallel to the plane of floating movement of the floating frame 91. Mounted in the cylinder 125 are pistons 126, respectively, in the frame 90. The rods 127 extend through the floating frame 91 and through the jaws 92. Each rod has enlarged outer ends 129 which engages the face of its associated jaw 92 which is opposite from the cylinder 125. Thus the frame 91 can float to predetermined position and the cylinders 125, pistons 126 and rods 127 float concurrently therewith. In operation, after the jaws have gripped the pipe and they and the frame 91 have floated with it to adjusted position, and pressure fluid is admitted to the rod end of the cylinder 125, whereupon the pistons 126 are forced to the left in FIG. 11 and the heads 129 are drawn firmly against the jaws 92, drawing them firmly against the floating frame 91 and thereby drawing it firmly against the stationary frame 90 with sufficient force to lock the floating frame and jaws 92 fixedly in adjusted and gripping position. By reversing the delivery of pressure fluid, the frame 91 and jaws 92 are released for floating. Pressure fluid may be supplied to the cylinder 125 by a suitable motor driven pump 130 through a reversing valve 131.

It is apparent that with the foregoing apparatus, a length of pipe can be positioned relative to the head axis by the positioner so as to offset to the maximum degree possible the deviation of the axis of the end portion to be threaded from a straight axis, and the pipe can be gripped and held in the new position by the floating chucks while the positioner is retracted to make the end portion accessible to the head and during threading.

Having thus described my invention, I claim:

1. An apparatus for positioning and holding a length of pipe with the axis of an end portion thereof, to be machined, in preselected relation to a predetermined fixed axis, and comprising a positioner operable to engage the length of pipe at a location between the ends of said portion and to move said portion transversely of said predetermined axis from one position to dispose the axis of the engaged portion in a predetermined different position relative to said predetermined axis and to hold the engaged portion with its axis in said predetermined different position and thereby to move the pipe to, and hold the pipe in, a new position, first and second holding chucks spaced apart from each other lengthwise of said predetermined axis and operable for gripping the pipe at axial locations spaced from said end portion, respectively, and from each other axially of the pipe, one of said axial locations being near to said positioner, the holding chuck for gripping the pipe at said one axial location being floatingly adjustable transversely of said predetermined axis and operable for gripping the pipe at said one axial location in the new position of the pipe, to which the pipe, at said one axial location has been moved transversely of said axis and in which the pipe is held by the positioner, and being lockable in adjusted positions against floating for securely holding the pipe, at said one axial location, in the new position, power means for operating the chucks, respectively, for holding the pipe in said new position, said positioner being operable, while the pipe is held in said new position, to release said end portion of the pipe and to move into spaced relation to said end portion, thereby to afford access, endwise of the pipe, from the outer end of the end portion, to the exterior surface of said end portion at said location, and power means for operating the positioner.

2. The apparatus according to claim 1 wherein the other of said holding chucks is also floatingly adjustable transversely of the predetermined axis and lockable in adjusted positions.

3. The apparatus according to claim 1 wherein the positioner has radially movable centering jaws which engage said portion of the pipe for so moving said portion, and said release of the positioner and movement of the positioner into said spaced relation is by radial retraction of the jaws from their centering position into radially spaced relation to said portion.

4. The apparatus according to claim 1 wherein a rotary cutting head is arranged with its rotational axis coincident with said predetermined axis, and is movable axially relatively toward the chucks and positioner to operative position and away from the chucks and positioner to a retracted position, and said end portion is rendered accessible to the head for machining by the head by movement of the positioner into said spaced relation to said portion.

5. The apparatus according to claim 4 wherein the positioner has radially movable centering jaws, and said jaws retract radially from the predetermined axis a sufficient distance to permit entry of the rotary cutting head between their inner ends.

6. The apparatus according to claim 3 wherein the power means for the positioner comprises rapid acting power means for moving the jaws radially to an inner position close to centering position and for retracting them from said inner position, and additional power means for moving the jaws from the inner position to centering position and for retracting them from centering position to said inner position.

7. The apparatus according to claim 1 wherein the positioner is positioned axially of the predetermined axis for engaging the said portion of the pipe midway between the ends of said portion.

8. The apparatus of claim 1 wherein the positioner comprises a body, a pair of jaw carriages mounted therein for movement toward and away from each other, means constraining the carriages to move toward each other in predetermined relation, jaw supports mounted on the carriages, respectively, each for movement relative to its carriage toward and away from the other support, jaws carried by the supports for movement by the carriages, and by the supports relative to the carriages, toward each other and away from each other, and said positioner power means comprises power means for moving the carriages toward each other and additional power means for moving the supports relative to the carriages.

9. The apparatus of claim 1 wherein the positioner comprises a body, carriages mounted thereon for movement in lineal paths, respectively, toward and away from a common central axis, mechanism interconnecting the carriages and constraining them to concurrent movement equidistantly along their paths, jaw supports mounted in the carriages, respectively, each for movement relative to its carriage in a lineal path parallel to the path of its carriage toward and away from said central axis, and said positioner power means comprises power means operatively connected to said mechanism for moving the carriages concurrently and additional power means for moving said supports relative to the carriage with the jaws carried on the supports.

10. The apparatus according to claim 9 wherein each jaw support is a cylinder of piston and cylinder assemblage, the cylinder is mounted for sliding axially on and relative to its carriage, a piston is reciprocable in the cylinder and has a rod fixed in position on the carriage, reversible means are provided for admitting pressure fluid from a source into the cylinder at opposite sides of the piston, selectively, and for venting the cylinder at the side of the piston opposite from that to which fluid pressure is admitted, and said assemblage and reversible means comprise said additional power means.

References Cited in the file of this patent

UNITED STATES PATENTS

| | | | |
|---|---|---|---|
| 2,685,095 | Butler | Aug. 3, | 1954 |
| 2,704,848 | Straty | Mar. 29, | 1955 |
| 2,798,234 | Benninghoff et al. | July 9, | 1957 |
| 2,932,041 | Benninghoff | Apr. 12, | 1960 |

UNITED STATES PATENT OFFICE
CERTIFICATE OF CORRECTION

Patent No. 3,153,250                            October 20, 1964

Donn W. Muehlhauser

It is hereby certified that error appears in the above numbered patent requiring correction and that the said Letters Patent should read as corrected below.

Column 4, line 53, for "suitable" read -- slidable --; column 8, line 70, for "carriage" read -- carriages --.

Signed and sealed this 24th day of August 1965.

(SEAL)
Attest:

ERNEST W. SWIDER                            EDWARD J. BRENNER
Attesting Officer                               Commissioner of Patents